Patented Aug. 12, 1941

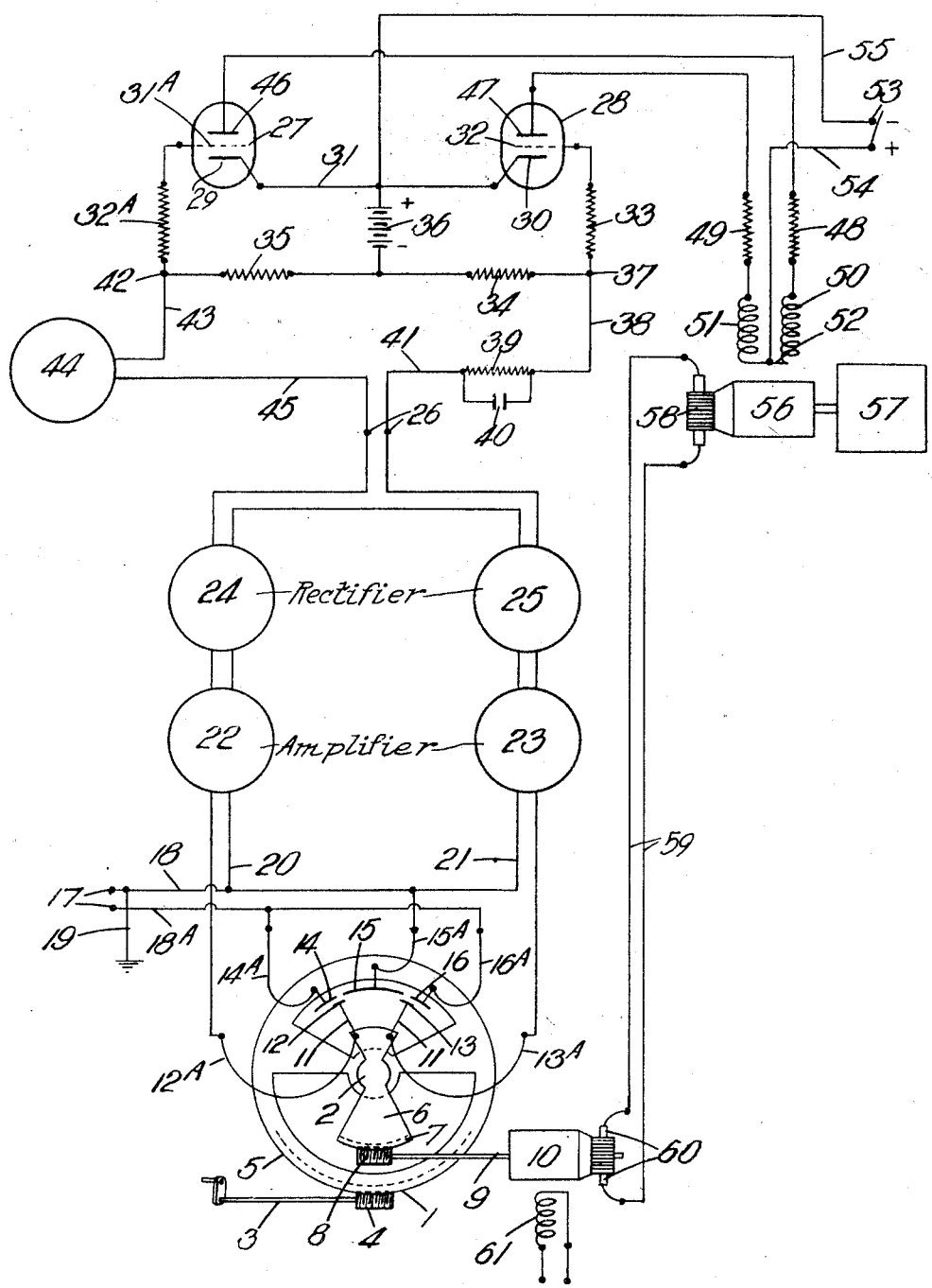

2,252,053

UNITED STATES PATENT OFFICE 2,252,053

ELECTRIC TRANSMISSION SYSTEM

John Percival Watson, Sidcup, England, assignor to Vickers-Armstrongs, Limited, London, England, a British company Application December 14, 1938, Serial No. 245,610 In Great Britain December 14, 1937

2 Claims. (Cl. 172—239)

This invention relates to electric transmission systems and is concerned with systems employed for power follow-up of a primarily moved control element which may be operated at varying speeds in either direction.

The object of the present invention is to provide a power follow-up system that is extremely sensitive, accurate and rapid in response, without imposing any measurable reaction on the member being followed.

Such a system has many applications as, for example, controlling repeater instruments from a magnetic compass, or mechanism in connection with sensitive gyroscopes.

With this object in view, there is afforded in accordance with the invention a power follow-up electrical transmission system in which the primarily moved control element of the system is so arranged in relation to a member adapted to move according to the output from the system, that when said control element moves relatively to said output member, an electrical network, normally balanced, is subject to a differential unbalancing force in magnitude and direction corresponding to the magnitude and direction of the relative displacement between the said control element and output member, such unbalanced force being so effective upon the output member as to tend to restore the initial balance of the network referred to, and thus maintain said control element and output member in a definite relative balanced position. Preferably the normally balanced network consists of an ionic valve system having output currents which may be balanced against one another to secure a normal zero output current.

In order that the said invention may be clearly understood and readily carried into effect the same will now be more fully described with reference to the accompanying drawing in which there is shown diagrammatically an example of an electrical transmission system, in accordance with the invention.

In the drawing, there is shown a circular frame 1 pivotally supported at its centre 2. The frame 1 may be angularly adjusted by means of a director 3 associated with a worm 4 meshing with teeth 5 formed on the frame 1. It will be appreciated that the director 3 may take any convenient form, according to the use to which the invention is to be put. For the sake of simplicity, in the illustrated example the director is a member for hand adjustment. About the same pivotal centre 2 there is also supported a second frame 6 which, in like manner, has a toothed portion 7 meshing with a worm 8. The latter is secured upon a shaft 9 which is driven by the rotor 10 of a D. C. motor. The frame 6 carries upon radial arms 11 a pair of plates 12 and 13. The frame 5 carries three plates 14, 15 and 16, the general shape and disposition of the pair of plates 12 and 13, and the three plates 14, 15 and 16, being such that the plates 12 and 13 are always the same distance, as measured in a radial direction, from the opposing adjacent portions of the said three plates. This last statement applies in any position of angular adjustment of the two frames, so that there is, in effect, an air space of constant depth between opposing plate portions. Each of the five plates has a flexible connection thereto 12A, 13A, 14A, 15A and 16A. There is a source of high frequency supply (not shown) applied across terminals 17 which are connected with conductors 18 and 18A. The flexible connections 16A and 14A are joined to the conductor 18A, whilst the flexible connection 15A is joined to the other conductor 18, which has an earth connection 19. Such conductor 18 has furthermore, connections 20 and 21 to amplifiers 22 and 23, to which the flexible leads 12A and 13A are also connected. The outputs from the amplifiers 22 and 23 are repectively fed to rectifiers 24 and 25 which may be regarded as being series connected to a pair of terminals 26. In actual fact, the terminals 26 need not exist as such, but it will be convenient herein to refer to the terminals for the purpose of discussing the operation of the apparatus.

The apparatus includes a balanced ionic valve system comprising triode valves 27 and 28. The filaments 29 and 30 thereof are connected together by means of a conductor 31 and it will be undersood that there is provided also a source of heating current for the filaments, this being omitted from the drawing for the sake of simplicity. The grids 31A and 32 of each valve are connected through loading resistances 32A and 33 and through a further pair of loading resistances 34 and 35 to one side of a grid bias battery 36. The other side of the bias battery 36 is connected to the lead 31 joining the cathodes of the valves. From the junction point 37 between the two loading resistances 33 and 34, there is a connection 38 to a resistance 39 which is shunted by a condenser 40. There is a connection 41 from the resistance 39 to one of the terminals 26. From the junction point 42 between the loading resistances 32A and 35 there is a connection 43 to a device 44, the purpose and nature of which will be indicated more fully hereinafter. There is a connection 45 from the device 44 to the other of the terminals 26.

The anodes 46 and 47 of the valves 27 and 28 are respectively connected to resistances 48 and 49, which are likewise connected with windings 50 and 51. The ends of the windings 50 and 51 are joined by a connection 52 which is, in turn, connected to one terminal of a pair 53 associated with a D. C. supply source (not shown) by means of a lead 54. The other terminal of the pair 53 is connected by a lead 55 with the conductor 31.

The windings 50 and 51 are formed as the excitation windings of a D. C. generator having an armature 56. The generator is driven from a motor 57, and its output is taken through brushes 58 upon leads 59 connecting with the brushes 60 of the D. C. motor armature 10. There is a field winding 61 associated with the armature 10 and connected to a constant D. C. supply source.

Turning now to a consideration of the plates 12 to 16, it will be observed that in the position of the plates shown the pair 12 and 13 are opposite the pair of plates 14 and 16 to an equal extent and that, furthermore, such plates 12 and 13 overlap, both to an equal degree, the plate 15. Thus the capacitative reactance of each circuit which may be regarded as completed through the capacitances afforded by the plates 12, 14, and 13, 15, 16, will in this case be equal. The amplifiers 22 and 23, therefore, receive equal inputs, in the position of the apparatus shown, and there are equal D. C. outputs from the rectifiers 24 and 25. The rectifiers are connected in opposition so that the potential at the terminals 26 may be regarded as zero. If now the frame 6 or the frame 1 is angularly displaced, then it will be clear that the coupling effect between the plates 12 and 14 is either effectively increased or decreased, whilst the capacitative coupling between the plates 13 and 16 is correspondingly decreased or increased. The effect of the differential alteration in the capacitative couplings will be to produce a similar differential alteration in the potential at the terminals 26 since, quite obviously, if there is a decrease in the output from, say, the rectifier 25, there will be a corresponding increase in the output from the rectifier 24. The direction in which the potential difference at 26 exists will clearly depend upon the direction of relative angular adjustment of the frames 1 and 6 and furthermore the magnitude of the potential difference at 26 will depend on the magnitude of the angular displacement between the frames from the zero position illustrated in the drawing.

When there is zero potential at the terminals 26 the grids 31A and 32 of the valves 27 and 28 are arranged to have the same biasing potential upon them and, therefore, the emission to the plates 46 and 47 will be substantially the same. Since the windings 50 and 51 are connected in the circuits of the respective anodes 46 and 47, the windings will develop equal magneto-motive forces. These windings are, however, so disposed that the net external magnetic effect is zero in the condition described. Thus, with the generator armature 56 rotating, there is nevertheless substantially zero output on the leads 59 to the motor armature 10, so that the latter is stationary. If now a potential difference develops at the terminals 26 then the control potential upon the one grid, say, 32 is increased whilst the control potential on the other grid 31A is correspondingly decreased. The anode currents of both valves are correspondingly disturbed and the balance between the magnetic effects of the windings 50 and 51 are similarly differentially disturbed. Thus, there is a resulting magneto-motive force from the windings 50 and 51 which is effective in exciting the generator armature 56. There is, therefore, a proportional output from the leads 59 so that the motor armature 10 is excited to a corresponding degree. As a result, the motor 10 produces rotation of the shaft 9 to recentre the frames 1 and 6, in such manner as to bring the plates to the zero position shown in the drawing. Thus a relative movement of the plates 12, 13 and 14, 15, 16 produces a differential unbalance of an otherwise balanced circuit, the resulting unbalanced force being applied to restore the system to the balanced position. Thus, the system has the action of a power follow-up.

The resistance 39 across which there is shunted the condenser 40 serves to assist to damp out hunting which might otherwise occur. Furthermore, it will be appreciated that under steady conditions the resistance 39 produces a drop in the potential so that the control voltage as applied across the points 37 and 42 is less than the potential difference available at the terminals 26. When, however, the potential at 26 is increasing or decreasing, the condenser 40 tends to check any change in the potential drop across the resistance 39, so that the increases or decreases become immediately effective across the control points 37 and 42. Thus, the control voltage between the points 37 and 42 is partly dependent on the relative displacement between the frames 1 and 6 from their zero position, and partly dependent upon the rate of change of the displacement.

What I claim and desire to secure by Letters Patent of the United States is:

1. In a sensitive power follow-up electrical transmission system using a recentering or restoring follow-up motor with a controlled output element having the mechanical output of said motor applied thereto and a Ward-Leonard generator supplying said motor, the combination of a control element, plate means, displaceable by said control element, a second movable plate means displaceable according to the movement of said output element of the system with respect to the first plate means, a normally balanced hard thermionic audio valve circuit connected in its output to govern the field of said Ward-Leonard generator and a source of electric current, between which audio valve circuit and current source said two plate means are arranged to form a capacitative coupling and capable of being restored by said follow-up motor, so that when the control element is moved, said capacitative coupling causes an E. M. F. to be introduced into said audio valve circuit, depending in direction and magnitude upon the respective direction and extent of said movement and in turn setting up a differential unbalance of the audio valve circuit, and a common control grid network for said thermionic hard valve circuit, including a resistance shunted by a capacitance capable of introducing into said network a component of potential proportional to the rate of change of the controlling potential.

2. In a sensitive power follow-up electrical transmission system using a follow-up motor with a controlled output element having the mechanical output of said motor applied thereto and a Ward-Leonard generator supplying said motor, the combination of a movable control element, one element thereof and one element of said controlled output element carrying plate means comprising three spaced plates displaceable by said control element, the other element of said control element and controlled output element carrying a second movable plate means including a pair of spaced plates displaceable according to the movement of said output element of the system with respect to the first mentioned plate means, the two groups of plates being mutually arranged to have a balance position when the pair of plates is disposed opposite the two spaces between the three plates, a normally balanced hard thermionic audio valve circuit connected in its output to govern the field of said Ward-Leonard generator and a source of electric current, means connecting the centre plate of said group of three plates to one side of a source of high frequency current and the other two plates of the same group to the other side of the same source, said two plate means arranged between said audio valve circuit and current source to form a capacitative coupling and be capable of being restored by said follow-up motor, so that when the control element is moved, said capacitative coupling causes an electromotive force to be introduced into said audio valve circuit, depending in direction and magnitude upon the respective direction and extent of said movement of said control element and in turn setting up a differential unbalance of the audio valve circuit, and means connecting each one of aforesaid pair of plates to a rectifying system, the outputs of the two rectifying systems thus connected being both fed to the grid circuit network of the normally differentially balanced hard thermionic valve circuit.

JOHN PERCIVAL WATSON.